B. O. AUSTIN.
SYSTEM OF CONTROL.
APPLICATION FILED OCT. 6, 1919.
1,427,342.
Patented Aug. 29, 1922.
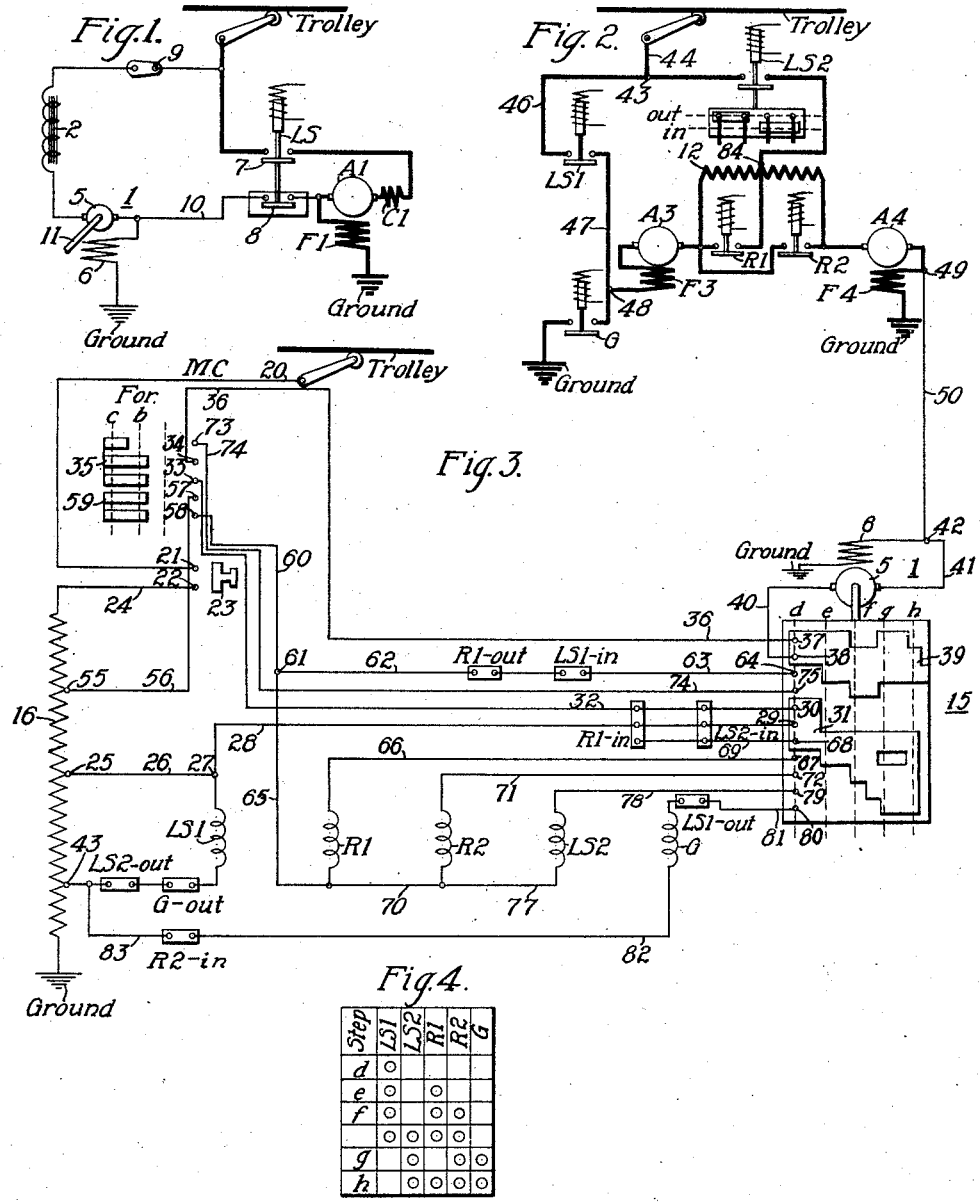
WITNESSES:
H. J. Shelhamer
W. P. Coley
INVENTOR
Bascum O. Austin
BY
Wesley G. Carr
ATTORNEY

UNITED STATES PATENT OFFICE.

BASCUM O. AUSTIN, OF WILKINSBURG, PENNSYLVANIA, ASSIGNOR TO WESTING-HOUSE ELECTRIC & MANUFACTURING COMPANY, A CORPORATION OF PENNSYLVANIA.

SYSTEM OF CONTROL.

1,427,342.   Specification of Letters Patent.   Patented Aug. 29, 1922.

Application filed October 6, 1919. Serial No. 328,847.

*To all whom it may concern:*

Be it known that I, BASCUM O. AUSTIN, a citizen of the United States, and a resident of Wilkinsburg, in the county of Allegheny and State of Pennsylvania, have invented a new and useful Improvement in Systems of Control, of which the following is a specification.

My invention relates to systems of control for dynamo-electric machines, and it has special relation to the automatic control of electric railway motors and the like.

One object of my invention is to provide auxiliary controlling apparatus in a system of the above-indicated character whereby automatic or load-controlled acceleration of either alternating-current or direct-current motors may be simply and reliably effected.

More specifically stated, it is an object of my invention to govern the operation of a main motor by means of a sequence switch that is actuated by a pilot motor, the energization of which is dependent upon the load traversing the main motor, whereby the rate of acceleration conforms to the load that the main motor is carrying at the time.

Another object of my invention is to provide a system of the character just set forth wherein at times the pilot motor is operated as a straight series machine, while, as soon as the main motor circuit is closed, the above-mentioned load-controlled action of the pilot motor is automatically inaugurated.

Other objects of my invention will become evident from the following detailed description taken in conjunction with the accompanying drawing, wherein—

Figure 1 is a simplified diagrammatic view of a system of control embodying the principles of the present invention;

Fig. 2 is a diagrammatic view of the main circuits of another motor system to which my invention may be applied;

Fig. 3 is a diagrammatic view of the auxiliary or control circuits organized in accordance with my invention for governing the main motors that are shown in Fig. 2; and Fig. 4 is a sequence chart of well-known form serving to indicate the order of operation of the various switches that are shown in Fig. 2.

Referring to Fig. 1 of the drawing, the system here shown is of the alternating-current single-phase type comprising supply-circuit conductors Trolley and Ground; a main motor having a commutator-type armature A1, an exciting or magnetizing field winding F1 and a neutralizing or compensating field winding C1; a pilot motor 1 for governing the operation of the main motor and which is itself controlled in part by a main-circuit line switch LS; and an inductive device 2 that is connected in circuit with the pilot motor 1 for a purpose to be set forth.

The pilot motor 1 comprises a commutator-type armature 5 and an exciting field winding 6. The line switch LS comprises a movable contact disk or plate 7 for completing the circuit of the main driving motor and an interlock or auxiliary switch 8 for connecting the main field winding F1 and the field winding 6 of the pilot motor in parallel relation under main-motor operating conditions.

Initially, that is, before the main motor is started into operation, a circuit is completed from the Trolley through switch 9, inductive device 2, the armature 5 and the field winding 6 of the pilot motor 1 to Ground. In this way, the pilot motor is initially connected to run as a straight series motor to actuate a drum controller or the like (not shown) through the agency of a suitable shaft 11, for example, for the purpose of governing the connections of the main driving motor or for returning the drum controller to its "off" position.

However, upon the closure of the line switch LS, either by the drum controller in question or by other means, a main circuit is established from the Trolley through the contact member 7 of the line switch, field winding C1, armature A1 and field winding F1 of the main motor to Ground. The closure of the switch LS completes a circuit from Ground through the main field winding F1, auxiliary switch or interlock 8 of the line switch LS, conductor 10 and field winding 6 of the pilot motor to Ground. Consequently, the current traversing the pilot-motor field winding 6 and, therefore, the speed of the pilot motor is dependent upon the load of the main motor. Since the operating speed of the pilot motor determines the rate of acceleration of the main motor, it follows that such acceleration will be effected in a desirably smooth and gradual manner without requiring the use of current relays or the like to intermittently interrupt the control operation.

For direct-current service, the inductive device 2 is not necessary, but should preferably be employed in alternating-current systems of the type shown in Fig. 1 in order to obtain more reliable operation. In addition to the automatic control of the pilot motor 1, through the medium of the load current traversing the main field winding F1, a further regulating action will be imposed upon the pilot motor by reason of any changes in power-factor of the main motor, which changes will effect a further slowing down of the pilot motor under heavy load conditions of the main driving motor.

It will be understood that my invention may also be readily applied to induction motors by connecting the exciting field winding of the pilot motor, under operating conditions of the system, across a resistor or an inductor in the main or secondary circuits of the induction motor.

Referring to the direct-current system that is illustrated in Fig. 2, a plurality of driving motors, respectively having armatures A3 and A4 and field windings F3 and F4, are adapted for series-parallel operation in conjunction with an accelerating resistor 12 by means of a plurality of switches LS1 and LS2 for governing the line connections, R1 and R2 for short-circuiting the accelerating resistor, and G for effecting ground connection. The supply-circuit conductors Trolley and Ground are again preferably employed.

Referring to the governing system shown in Fig. 3, the pilot motor 1 is adapted to govern a sequence switch 15 for effecting control of the actuating coils for the various switches that are illustrated in Fig. 2 under predetermined operating conditions, together with a plurality of interlocks or auxiliary-circuit members of the familiar type that is shown in connection with the switch LS2 in Fig. 2, and a master controller MC for primarily directing energy derived from a control resistor 16 to the various circuits.

Assuming that it is desired to effect acceleration of the motors illustrated in Fig. 2, an auxiliary switch 23, which is preferably operated by foot, is concurrently moved toward the left into a circuit-closing position. Under such conditions, a circuit is established from the Trolley through conductor 20, control fingers 21 and 22, which are bridged by the foot-controlled switch 23 in its operative position, conductor 24 and the control resistor 16, to Ground.

The preferred form of mechanical interlocking between the foot-controlled switch 23 and the master controller MC, whereby false operation is prevented, is set forth and claimed in a copending application of Louis M. Aspinwall and Harry R. Meyer, Serial No. 335,492, filed Nov. 3, 1919, and assigned to the Westinghouse Electric & Manufacturing Company.

As soon as the control resistor 16 is energized, a circuit is established from a tap-point 25 in the control resistor 16 through conductor 26, junction-point 27, actuating coil of the line switch LS1, and interlocks G-out and LS2-out to a second tap-point 43 in the control resistor. Consequently, the line switch is closed, as indicated in step $d$ of the sequence chart, Fig. 4, to complete a main circuit (Fig. 2) from the Trolley through conductor 44, junction-point 45, conductor 46, switch LS1, conductor 47, junction-point 48, field winding F3, armature A3, the entire accelerating resistor 12, armature A4, junction-point 49, and field winding F4 to Ground. In this way the main motors are connected in series relation with the accelerating resistor 12 across the supply circuit.

The main-circuit connections are not of my present invention, but are set forth and claimed in a copending application of Andrew H. Candee, Serial No. 328,842, filed Oct. 6, 1919, and assigned to the Westinghouse Electric & Manufacturing Company.

The master controller MC may then be actuated to its operative position $b$ corresponding to series connection of the motors and operation thereof in the forward direction, whereupon a circuit is established from the tap-point 25 through conductor 26, junction-point 27, conductor 28, control fingers 29 and 30, which are bridged by contact segment 31 of the sequence switch 15, conductor 32, control fingers 33 and 34, which are bridged by contact segment 35 of the master controller, conductor 36, control fingers 37 and 38, which are bridged by contact segment 39 of the sequence switch 15, conductor 40, armature 5 of the pilot motor 1, conductor 41, junction-point 42 and field winding 6 of the pilot motor to Ground. The pilot motor 1 is thus started into operation as a straight series-connected motor, and the sequence switch 15 gradually approaches its second operative position $e$.

As soon as the current in the main field winding F4 has built up, the previously-described load control of the pilot motor 1 comes into effect by reason of the fact that conductor 50 connects junction-point 49 between the armature A4 and the field winding F4 with junction-point 42 between the armature 5 and field winding 6 of the pilot motor. In other words, the field windings F4 and 6 are connected in parallel relation, as described in connection with Fig. 1, and subsequent operation of the pilot motor 1 is dependent upon the load of the main driving motors.

The action of the pilot motor may be more fully explained as follows. While zero current obtains in the main field winding F4, the junction-points 42 and 49 are practically at ground potential, since the resistances of the field windings F4 and 6 are very low. Consequently, a maximum voltage is impressed across the pilot-motor armature 5 and a minimum voltage across the field winding 6. On the other hand, with full-load current flowing through the main motors, junction-points 42 and 49 have an appreciable potential by reason of the voltage drop across the main field winding F4; or in other words, the armature voltage is decreased and the field-winding voltage is increased, in the pilot motor.

Thus, under accelerating conditions, the armature 5 and the field winding 6 of the pilot motor are jointly and directly affected to produce an increase or decrease in the speed of the sequence switch 15.

As soon as the sequence switch 15 reaches its position $e$, another circuit is established from a tap-point 55 in the control resistor 16, through conductor 56, control fingers 57 and 58, which are bridged by contact segment 59 of the master controller, conductors 60 and 65, actuating coil of the switch R1, conductor 66, control fingers 67 and 29, which are temporarily bridged by contact segment 31 of the sequence switch 15, thence through conductors 28 and 26 to the tap-point 25 in the control resistor 16.

As soon as the switch R1 is closed, a holding circuit is established from the contact segment 31 through control finger 68, conductor 69 and interlock R1-in to the conductor 28. Consequently, the disengagement of control finger 29 from the contact segment 31 in position $e$ does not affect the system. Furthermore, the previously-traced circuit for the pilot motor 5 between conductors 29 and 32 is bridged by another portion of the above-mentioned interlock R1-in and, therefore, the disengagement of control fingers 29 and 30 from the contact segment 31 does not interrupt the pilot-motor circuit.

As the sequence switch 15 approaches its next position $f$, a new circuit is completed from the energized conductor 65, through conductor 70, actuating coil of the switch R2, conductor 71 and control finger 72 to the contact segment 31, whence circuit is continued to the tap-point 25 in the control resistor 16, as previously traced.

Consequently, in positions $e$ and $f$ of the sequence switch, the resistor 12 is short-circuited in steps to effect smooth acceleration of the motors to full series relation, as represented by position $f$ of the sequence switch.

The pilot motor 1 is de-energized just before position $f$ is reached by reason of the disengagement of control finger 37 from the contact segment 39. Consequently, the sequence switch 15 automatically stops in its series connecting position $f$ when the master controller occupies its position $b$.

However, by actuating the master controller MC to its position $c$, a new circuit is established from the contact segment 35 through control finger 73, conductor 74, and control finger 75 to contact segment 39 of the sequence switch. In this way, the pilot motor 1 is again energized to actuate the sequence switch toward its position $g$. Although the circuit just traced is interrupted in that position, the initally traced circuit including control finger 37 is again established by that time by reason of the peculiar configuration of the contact segment 39 and, therefore, continuous movement of the sequence switch from position $f$ to position $h$ occurs.

After the sequence switch leaves position $f$, a new circuit is established from the energized conductor 70, through conductor 77, actuating coil of the line switch LS2, conductor 78 and control finger 79, to contact segment 31. The line switch LS2 is thus closed to effect a direct connection between trolly-connected conductor 44 and an intermediate point 84 in the accelerating resistor 12. The switch LS1 thereupon drops out by reason of the exclusion of the interlock LS2-out from the circuit of its actuating coil.

As the sequence switch approaches position $g$, control finger 67 becomes disengaged from the contact segment 31 to effect the opening of switch R1 and, subsequently, contact segment 31 engages control finger 80, whence a new circuit is continued through conductor 81, interlock LS1-out, actuating coil of the switch G, conductor 82, interlock R2-in and conductor 83 to the tap-point 43 in the control resistor 16.

The two sections of the accelerating resistor 12 are thus connected in parallel relation since the switch R2 remains closed, and the main circuits (Fig. 2) may be traced as follows: from the Trolley through conductor 44, junction-point 45, switch LS2, junction-point 84, the parallel-connected sections of the resistor 12 and switch R2, where the circuit divides, one branch including armature A3, field winding F3, junction-point 48 and switch G to Ground, while the other branch includes armature A4, junction-point 49 and field winding F4 to Ground. Energization of the pilot motor 1 and, therefore, movement of the sequence switch 15 continues until position $h$ is reached, whereupon the control finger 37 again becomes disengaged from contact segment 39 to deenergize the pilot motor and effect stoppage of the sequence switch in the full parallel position $h$.

In this position, control finger 67 again engages contact segment 31, whereby the switch R1 is closed to short-circuit both sections of the accelerating resistor 12 and thus connect the motors in full parallel relation.

To return the sequence switch 15 to its illustrated initial position $d$, it is not necessary to reverse the connections of the pilot motor 1, since the sequence switch 15 is adapted to operate always in one direction or, in other words, movement of the switch beyond position $h$ serves to turn the switch, if of the preferred drum type, through a given angle until initial position $d$ is occupied. Such movement of the sequence switch is obtained as follows. The master controller MC is returned to its "off" position, when it is desired to stop the car, whereupon the switch R1 opens by reason of the de-energization of its actuating coil, while the line switch LS1 again closes by reason of the reinsertion of interlocks G-out and LS2-out in the circuit of its actuating coil. By moving the master controller to its position $b$ or any other operative position, when it is desired to again accelerate the motors, the conductor 60 is energized and a circuit is completed therefrom through junction-point 61, conductor 62, interlocks R1-out and LS1-in, conductor 63, control finger 64 and contact segment 39 of the sequence switch 15 in its position $h$. Such energization obtains until the sequence switch 15 has been rotated in the constant direction as far as the position $d$, where the pilot motor circuit just traced is interrupted, but the sequence switch continues to move because of the re-establishment of the control circuits already described, in connection with initial position $d$.

Furthermore, the proper action automatically occurs even through the sequence switch occupies some operative position other than $h$, when it is desired to stop the vehicle. In such a case, the master controller is simply returned to its "off" position and is subsequently actuated to the selected operative position, whereupon the sequence switch runs through the remaining operative positions and as far as initial position $d$, as previously described. No switches are actuated during this operation for the reason that control fingers 29 and 30 of the sequence switch do not engage the contact segment 31 in any position except $d$, so that the actuating coils of switches R1, R2, LS2 and G cannot be energized through those control fingers. Moreover, the control fingers 29, 30 and 68 are not bridged by either of the interlocks R1-in and LS2-in, since the corresponding switches both occupy open or "out" positions.

Consequently, the pilot motor 1 operates as a straight series motor to quickly turn the drum 15 to its initial position $d$, irrespective of what other position the drum occupies when the master controller is actuated to an operative position to begin another movement of the vehicle.

I do not wish to be restricted to the specific circuit connections or arrangement of parts herein set forth, as various modifications thereof may be made without departing from the spirit and scope of my invention. I desire, therefore, that only such limitations shall be imposed upon my invention as are indicated in the appended claims.

I claim as my invention:

1. In a system of control, the combination with a main dynamo-electric machine, of a controlling device therefor, an auxiliary dynamo-electric machine for actuating said device, and means for causing said auxiliary machine to operate in accordance with the main motor load and its own load under different operating conditions of the system.

2. In a system of control, the combination with a main dynamo-electric machine, of a controlling device therefor, a switch for effecting certain main-machine connections, an auxiliary dynamo-electric machine for actuating said device, and means governed by said switch for regulating the operation of said auxiliary machine.

3. In a system of control, the combination with a main dynamo-electric machine, of a controlling device therefor, a switch for effecting certain main-machine connections, an auxiliary dynamo-electric machine for actuating said device, and means for energizing said auxiliary machine as a series motor unless said switch occupies a predetermined position.

4. In a system of control, the combination with a main dynamo-electric machine, of a controlling device therefor, a switch for effecting certain main-machine connections, an auxiliary dynamo-electric machine for actuating said device, and means responsive to the closure of said switch for rendering the energization of said auxiliary machine dependent upon predetermined electrical conditions in the main machine.

5. In a system of control, the combination with a main dynamo-electric machine, of a controlling device therefor, a switch for effecting certain main-machine connections, an auxiliary dynamo-electric machine for actuating said device, and means actuated by the closure of said switch for rendering the operation of said auxiliary machine dependent upon the main-machine load.

6. In a system of control, the combination with a main dynamo-electric machine, of a controlling device therefor, a switch for effecting a supply-circuit connection for the main machine, an auxiliary dynamo-electric machine for actuating said device, and means for energizing said auxiliary machine as a series motor unless said switch is closed.

7. In a system of control, the combination with a supply circuit and a main dynamo-electric machine, of a controlling device therefor, a switch for completing the connection of said machine across said supply circuit, an auxiliary dynamo-electric machine for actuating said device, and means responsive to the closure of said switch for connecting the field windings of the two machines in parallel relation.

8. In a system of control, the combination with a main dynamo-electric machine, of a controlling device therefor, an auxiliary dynamo-electric machine for actuating said device, a plurality of switches for effecting certain main-circuit connections, and means dependent upon the closure of one switch and the opening of another for effecting movement of the controlling device from its final operative position to its "off" position.

9. In a system of control, the combination with a main dynamo-electric machine, of a controlling device therefor, an auxiliary dynamo-electric machine for actuating said device, a line switch and another switch for governing the main machine, and means dependent upon the closure of the line switch and the opening of said other switch for effecting movement of the controlling device in the forward direction from its final operative position to its "off" position.

10. In a system of control, the combination with a main dynamo-electric machine, of a controlling device therefor, an auxiliary dynamo-electric machine for actuating said device and having an armature and a field winding and means for varying the voltages of said armature and field winding inversely as the main-machine load increases.

11. In a system of control, the combination with a main dynamo-electric machine, of a controlling device therefor, an auxiliary dynamo-electric machine for actuating said device, a switch for effecting certain main-circuit connections, and means responsive to the closure of said switch for decreasing the armature voltage and increasing the field voltage of said auxiliary machine.

12. In a system of control, the combination with a main dynamo-electric machine, of a controlling device therefor, an auxiliary dynamo-electric machine for actuating said device, a plurality of switches for effecting certain main-circuit connections, and means dependent upon the position of said switches for effecting movement of the controlling device from any operative position to the initial position.

13. In a system of control, the combination with a main dynamo-electric machine, of a controlling device therefor, an auxiliary dynamo-electric machine for actuating said device, a plurality of switches for effecting certain main-machine connections, means dependent upon the position of said switches for effecting movement of the controlling device in the forward direction from any operative position to the initial position, and means for preventing main-machine operation during such movement.

14. In a system of control, the combination with a dynamo-electric machine and a controlling device therefor, of means responsive respectively to the machine load and to only its own current under different operating conditions of the system for actuating said device.

15. In a system of control, the combination with a dynamo-electric machine and a controlling device therefor, of a switch for effecting certain machine-circuit connections, means for actuating said device, and means governed by said switch for regulating the operation of said actuating means.

16. In a system of control, the combination with a dynamo-electric machine and a controlling device therefor, of a switch for effecting certain machine-circuit connections, means for actuating said device, and means responsive to the closure of said switch for rendering the energization of said actuating means dependent upon predetermined electrical conditions in said machine.

17. In a system of control, the combination with a dynamo-electric machine and a controlling device therefor, of a switch for effecting certain machine-circuit connections, means for actuating said device, and means responsive to the closure of said switch for rendering the operation of said actuating means dependent upon the machine load.

18. In a system of control, the combination with a dynamo-electric machine and a controlling device therefor, of a switch for effecting certain machine-circuit connections, plural-winding means for actuating said device, and means responsive to the closure of said switch for connecting certain of the windings of said machine and of said plural-winding means in parallel relation.

19. In a system of control, the combination with a dynamo-electric machine and a controlling device therefor, of a plural-winding means for actuating said device, and connections whereby the voltages of the windings of said plural-winding means are varied inversely as the machine load increases.

20. In a system of control, the combination with a dynamo-electric machine and a controlling device therefor, of a plural-winding means for actuating said device, a switch for effecting certain machine-circuit connections, and means responsive to the closure of said switch for respectively increasing and decreasing the voltages of the windings of said plural-winding means.

21. In a system of control, the combination with a supply circuit, a dynamo-electric machine and a controlling device therefor, of a switch for completing the connection of said machine across said supply circuit, plural-winding means for actuating said device, and means responsive to the closure of said switch for connecting the machine field winding in parallel relation to one of the windings of said actuating means.

In testimony whereof, I have hereunto subscribed my name this 4th day of Oct. 1919.

BASCUM O. AUSTIN.